(12) United States Patent
Backmann et al.

(10) Patent No.: US 10,144,167 B2
(45) Date of Patent: Dec. 4, 2018

(54) MONITORING METHOD AND DEVICE

(71) Applicant: Windmöller & Hölscher KG, Lengerich (DE)

(72) Inventors: Martin Backmann, Lengerich (DE); Gerhard Middelberg, Lengerich (DE); Markus Bussmann, Essen (DE); Jens Minnerup, Oberhausen (DE)

(73) Assignee: Windmöller & Hölscher KG, Lengerich (DE)

( * ) Notice: Subject to any disclaimer, the term of this patent is extended or adjusted under 35 U.S.C. 154(b) by 605 days.

(21) Appl. No.: 14/442,402

(22) PCT Filed: Sep. 26, 2013

(86) PCT No.: PCT/EP2013/070061
§ 371 (c)(1),
(2) Date: May 13, 2015

(87) PCT Pub. No.: WO2014/075842
PCT Pub. Date: May 22, 2014

(65) Prior Publication Data
US 2016/0107361 A1    Apr. 21, 2016

(30) Foreign Application Priority Data
Nov. 13, 2012  (DE) .................. 10 2012 110 911

(51) Int. Cl.
*B29C 47/08*    (2006.01)
*B29C 47/92*    (2006.01)
*B29C 47/00*    (2006.01)
*B29C 47/10*    (2006.01)

(52) U.S. Cl.
CPC .......... *B29C 47/0813* (2013.01); *B29C 47/92* (2013.01); *B29C 47/0026* (2013.01);
(Continued)

(58) Field of Classification Search
None
See application file for complete search history.

(56) References Cited

U.S. PATENT DOCUMENTS 2,832,879 A * 4/1958 Van Riper .............. G05D 23/22
165/287
4,551,289 A    11/1985 Schwab et al.
(Continued)

FOREIGN PATENT DOCUMENTS

CN    87106914    1/1988
DE    3304865    8/1984
(Continued)

OTHER PUBLICATIONS

Notification of Office Action and Search Report dated Jul. 4, 2016 From the State Intellectual Property Office of the People's Republic of China Re. Application No. 201380059338.8 and Its Translation of Office Action Into English.
(Continued)

*Primary Examiner* — Matthew J Daniels
*Assistant Examiner* — Kelsey C Grace

(57) ABSTRACT

The invention relates to a monitoring method for monitoring the energy requirement of an extrusion installation (10), comprising the following steps:
  Setting of a balancing limit (20), in whose balancing space (22) the extrusion installation (10) is assembled,
  Monitoring of at least one energy flow (30) into the balancing space (22),
  Monitoring of a feed flow (40) of granules in the extrusion installation (10),
  Determining the relation between the at least one energy flow (30) and the feed flow (40).

8 Claims, 2 Drawing Sheets

(52) U.S. Cl.
CPC ........ *B29C 47/084* (2013.01); *B29C 47/1027* (2013.01); *B29C 2947/92047* (2013.01); *B29C 2947/9298* (2013.01); *B29C 2947/92104* (2013.01); *B29C 2947/92333* (2013.01); *B29C 2947/92371* (2013.01); *B29C 2947/92476* (2013.01)

(56) References Cited

U.S. PATENT DOCUMENTS

| | | | | |
|---|---|---|---|---|
| 5,122,315 | A | * | 6/1992 | Darley .................... B29C 47/38 264/40.1 |
| 5,259,670 | A | | 11/1993 | Brown |
| 2005/0080507 | A1 | * | 4/2005 | Silberg ................ B29C 47/0876 700/196 |

FOREIGN PATENT DOCUMENTS

| | | |
|---|---|---|
| DE | 69014227 | 6/1995 |
| EP | 0265601 | 5/1988 |
| WO | WO 2014/075842 | 5/2014 |

OTHER PUBLICATIONS

International Preliminary Report on Patentability dated May 14, 2015 From the International Bureau of WIPO Re. Application No. PCT/EP2013/070061 and Its Translation Into English.
International Search Report and the Written Opinion dated Feb. 12, 2014 From the European Patent Office Re. Application No. PCT/EP2013/070061 and Its Translation Into English.
Pruefungsantrag [Examination Report] dated Jun. 14, 2013 From the Deutsches Patent—und Markenamt [German Patent and Trademark Office] Re. Application No. 102012110911.7.
Fischer "Neue Wege fuer die Automatisierung der Rohrextrusion. Kostenguenstige Loesungen bei richtigem Einsatz", Kunststoffberater, XP001354048, 30(3): 27-31, Mar. 1985. p. 27, col. 1, p. 28, col. 3, p. 29, col. 1-p. 31, col. 1.
Karl "Messen, Steuern and Regeln an Blasfolien-Extrusionsanlagen", Kunststoffe, XP000297626, 81(10): 902-906, Oct. 1991. p. 902, col. 2-p. 903, col. 2, p. 904, col. 2, p. 905, col. 2-p. 906, col. 1.
Menges et al. "Prozessananlyse an einem Kautschukextruder", Kautschuk & Gummi Kunststoffe, XP001353790, 35(9): 733-746, Sep. 1982. p. 733, col. 2, p. 734, col. 2, p. 736, col. 1-p. 737, col. 1, p. 738, col. 1, p. 746, col. 1.

* cited by examiner

MONITORING METHOD AND DEVICE

RELATED APPLICATIONS

This application is a National Phase of PCT Patent Application No. PCT/EP2013/070061 having International filing date of Sep. 26, 2013, which claims the benefit of priority of German Patent Application No. 10 2012 110 911.7 filed on Nov. 13, 2012. The contents of the above applications are all incorporated by reference as if fully set forth herein in their entirety.

FIELD AND BACKGROUND OF THE INVENTION

The present invention relates to a monitoring method for monitoring the energy requirement of an extrusion installation and an extrusion installation with at least an extruder and at least a control device for the performance of a monitoring method.

It is known that for the production of plastic components, particularly of plastic films, extrusion installations are used. Such extrusion installations comprise one or multiple single extruders which can fuse granules with the help of an extruder screw and can lead the granules to an extruder nozzle. For the use of each single extruder and correspondingly for the operation of the whole extrusion installation energy is necessary. This is energy is applied to the extrusion installation by different media. These are besides the electrical connection to the electric current the supply of cooling air, particularly as compressed air (in norm $m^3$), and the supply of cooling water. Naturally, also other energy flows are possible in order to supply the extrusion installation.

It is disadvantageous with known extrusion installations that a feedback concerning the current energy requirement, particularly regarding the used recipe in the extrusion installation, can occur only with high effort. This feedback is for example provided by separate monitoring systems which have to be coupled with the extrusion installation via necessarily provided interfaces. Accordingly, such monitoring systems are equipped with additional sensors which can in a known manner monitor the energy efficiency of such installations via interfaces. However, this leads to a high constructional effort, since such interfaces have to be provided. Likewise, the cost-effort for such monitoring systems is relatively high, since particularly a plurality of additional sensors is necessary in order to monitor the energy requirement.

SUMMARY OF THE INVENTION

It is the object of the present invention to at least partially avoid the previously described disadvantages. Particularly it is object of the present invention to provide a monitoring method and an extrusion installation which can monitor the energy requirement of the extrusion installation in a cost-efficient and simple manner.

The previous object is solved by a monitoring method and an extrusion installation. Further features and details of the invention result from the dependent claims, the description and the drawings. Thereby, features and details which are described in connection with the monitoring method according to the invention naturally also apply in connection with the extrusion installation according to the invention and vice versa, so that according to the disclosure of the single aspects of the invention it can always be reciprocally related to.

With an extrusion installation in the scope of the present invention it is particularly about a plastic extrusion installation. Preferably, the extrusion installation according to the invention is configured as a plastic film extrusion installation. A possible embodiment of the present invention provides a blown film extrusion installation. Particularly the relatively high temperatures during the fusion of thermoplastic or other plastics generate a high energy requirement. Specifically in such a case the described advantages of the method according to the invention appear particularly obvious. For example, such a plastic extrusion installation can comprise a nozzle for the output of the liquid plastic. Likewise, a nozzle is possible in the subordinated cooling composition.

A monitoring method according to the invention serves for monitoring the energy requirement of an extrusion installation. Such a monitoring method comprises the following steps:

Setting of a balancing limit, in whose balancing space the extrusion installation is situated, Monitoring of at least one energy flow into the balancing space, Monitoring of a feed flow of granules in the extrusion installation, Determining the relation between the at least one energy flow and the feed flow.

The monitoring method according to the invention thereby particularly uses the sensor technology, which is already existing in the extrusion installation. Thus, for the regulation of the extrusion installation, particularly the regulation of the single extruders, a monitoring of the feed amount and accordingly a measurement or determination of the feed flow of granules is necessary. This parameter is therewith already monitored and can be beneficial for the method according to the invention without additional measurement effort.

Further, at least one energy flow is monitored. This can occur in a direct or also in an indirect manner. Energy flows within the sense of the present invention are for example the feed flows of cooling water and/or cooling air, particularly in form of compressed air (in norm $m^3$). Likewise, the electrical connection is a corresponding energy flow within the sense of the present invention. A direct measurement further occurs preferably directly in kilowatt hour or kilowatt, in order to directly have the desired unit as an input parameter for the method according to the invention. Naturally, also indirect measurements are possible, so that the current flow or the volume current is determined in liter per hour or norm cubic meter per hour of cooling air and/or cooling water. From this indirect measurement a conclusion about the energy content of the respective energy flow can be drawn arithmetically. Particularly, therefore also the temperature of the respective energy flow, namely the cooling water and/or the cooling air, is applied. Likewise for monitoring of at least one energy flow preferably the already existing measurement sensors of the extrusion installation are used. With the monitoring of an electric current as an energy flow for example an electric meter can be used, which is already existent in the extrusion installation. Flow meter can already be intended in the extrusion installation for the regulation of cooling air or cooling water and their measured data can be used for the method according of the invention for monitoring of the at least one energy flow.

By the performance steps of a method according to the invention it becomes possible that monitoring the energy requirement of the extrusion installation becomes possible mainly without additional measurement sensor technology and particularly without additional interfaces. A structural alteration of existing extrusion installations is therewith not necessary or only in a small amount. In comparison to known monitoring systems accordingly the energy requirement of the extrusion installation can be monitored in a cost-efficient and simple manner.

The monitoring according to the monitoring method according to the invention can naturally also be added to other operation purposes. Thus, the results from the monitoring can serve as input parameters for subsequent regulations of the extrusion installation or also for other devices. This regulation is for example the regulation of temperatures within the extrusion installation, the regulation of the cooling of the escaping product from the extrusion installation or even the regulation of the air conditioning of a hall, in which the extrusion installation is assembled.

The previously described possibilities of regulation are among others only possible by a definition of the balancing limit according to the invention. In comparison to known extensive monitoring systems in this manner a balancing space can be generated which completely includes the extrusion installation. Thereby, also other shares of energy can be recognized, which are not recognized by the known monitoring systems. This is particularly the matter about waste heat of an extrusion installation which for example can be used for the regulation of the air conditioning of a hall in which the extrusion installation is assembled.

A determination of the relation between the at least one energy flow and the feed flow can also be understood as a generation of a characteristic or parameter. Thereby, the energy flow can be set into relation to the feed flow so that a relation occurs, which enables a prediction about the current energy efficiency status of the operation of the extrusion installation. Further it is possible to specify this relation to the respectively used recipe. The respective characteristic enables a quick statement about the current energy state of the extrusion installation. Thus, using this information an intervention into the control or regulation of the extrusion installation can occur manually, in a semi-automatic or even fully automatic manner. Possibly existing deviations from standard values, like this is subsequently described, can thereby be avoided or minimized in a cost-efficient, fast and simple manner.

If a plurality of energy flows is monitored, the total energy record can be monitored by addition and a relation between this sum of the monitored energy flow and the feed flow can be generated in a simple manner. Besides the influence possibility of the results of a monitoring method according to the invention to the control and/or regulation of the extrusion installation, naturally also display devices can be intended which represent the current energy situation of the extrusion installation, for example in form of a tachometer or in form of a traffic light.

A monitoring method according to the invention can be further improved in a way that at least one of the following energy flows is monitored:
  Cooling water
  Cooling air, particularly in form of compressed air (in norm $m^3$)
  Electric current.
Naturally, the previous enumeration is a non-exclusive list. Accordingly, also other cooling media, particularly cooling fluids, can represent an energy flow as an energy carrier within the sense of the present invention. The cooling water can be further subdivided in cooling water which is used for the performed extrusion process and in cooling water which is used for the cooling of machines. All values can thereby be determined directly and also indirectly. A direct determination relates to a direct measurement of the energy values in watt or kilowatt hours. An indirect measurement can for example generate the desired statement of the monitoring, for example via the volume flow of the respective cooling media relating to the supplied temperature.

Another advantage can occur when with the monitoring method according to the invention at least two energy flows into the balance space are monitored. Thereby, the sum of the monitored energy flows is used for the determination of the relation to the feed flow. This permits a broader monitoring of the energy situation of the monitoring method according to the invention. Particularly all, especially all substantial energy flows to the balancing space are monitored. The summation of all monitored energy flows allows a simple and especially fast performance of a monitoring method according to the invention. Independent from the amount of the monitored energy flows only one relation is determined, so that a single parameter as a result of this relation represents a parameter for the current energy state of the extrusion installation. The sum can thereby be generated automatically or semi-automatically, particularly by a control device. This control device performs the determination of the relation, preferably also semi-automatically or automatically.

It can be a further advantage, when with a monitoring method according to the invention additionally the monitoring of at least one energy flow of an extruder of the extrusion installation occurs, for which the relation to the feed flow to this extruder is determined. With other words, additionally to the consideration of the energy situation of the whole extrusion installation, a higher resolution of the monitoring can occur. Thus, now also the energy situation of a single extruder can be determined with a method according to the invention. Accordingly, a smaller balancing limit for this sub-step of the method according to the invention is defined. This smaller balancing limit includes the respective extruder in its balancing space. With this embodiment of the method higher resolution of the monitoring can occur so that a more exact possibility of invention for the control or regulation of the extrusion installation becomes possible. Particularly, conclusions about the efficiency of single extruders can be carried out within the extrusion installation.

Likewise it can be an advantage when with the monitoring method according to the invention at least two energy flows are monitored, wherein for each energy flow the relation to the feed flow is individually determined. The energy situation is therewith specified to the respective energy flow. This increases likewise the amount of the values which are provided with the monitoring method according to the invention. Therewith, a plurality of values can be used as input values for the intervention in a control or regulation of the extrusion installation. This intervention can now occur in detail so that a simplified and even more accurate counter measurement against the undesired energy situation of the extrusion installation becomes possible.

Likewise it is an advantage when with the monitoring device according to the invention the waste heat of the extrusion installation is monitored via the determination of the relation of the performed mechanic work in the extrusion installation and the at least one monitored energy flow. With other words, by an analysis, for example in a control device, this waste heat can be determined without detailed measurements of the waste heat. Accordingly, the measurement sensor technology and the corresponding installations in the extrusion installation can be omitted. Therefore, the waste heat serves as an additional degree for the efficiency for the operation of the extrusion installation, particularly with this embodiment of the monitoring method according to the invention. Further, the information about the waste heat can be used for a more precise and especially more efficient regulation of an air condition for the installation site of the extrusion installation and/or for the cooling devices for the extruder product.

A method according to the invention can be further improved in a way that the determined relation between the at least one energy flow and the feed flow is saved in a database regarding the used recipe in the extrusion installation. The database accordingly establishes data sets for the single recipes about the operation of the extrusion installation with the monitoring method according to the invention. For each recipe one or multiple parameters from the determination of the relation according to the invention are in the database over the time course of the use of the extrusion installation. This database can be used for the analysis of the energy efficiency related to the single recipes. Particularly a comparison of the actual situation with the reference values saved within the database can occur in order to monitor the energy efficiency of the extrusion installation. Also alterations of the energy efficiency, a trend towards an improvement or deterioration of the total efficiency of the extrusion installation, can be recognized in this manner over a long time of operation of the extrusion installation. Thus, an appropriate maintenance of the extrusion installation can occur in order to avoid unnecessary early maintenance steps. At the same time, a maintenance in time is ensured in order to avoid unnecessary poor energy efficiency operating manners of the extrusion installation. This database can also be understood for the direct and also for the long-lasting control or regulation of the extrusion installation. As a recipe within the sense of the present invention the mixture of materials has to be understood which are supplied to the extrusion installation as a feed flow.

A monitoring method according to the previous paragraph can be improved in a way that a comparison of the defined relation between the at least one energy flow and the feed flow and a saved relation of a currently used recipe for the extrusion installation is performed. By this comparison a tendency acquisition can become possible. Depending on how far a deviation occurs from the set value, the actual value can be restored by an intervention into the controlling or regulation of the extrusion installation. This can occur by a manual, semi-automatic or even automatic readjusting of the extrusion installation or its operating parameters. In high deviation cases this can even lead to a stop of the extrusion installation. Particularly, an optimization of the operation or the operational manner of the extrusion installation occurs in this manner.

It is further an advantage, when with the monitoring device according to the invention according to the two previous paragraphs a plurality of determined relations between the at least one energy flow and the feed flow are saved in the database. Accordingly, for each recipe preferably two or more different parameters are saved. This can also be described as a so called self-learning system. From the plurality of saved parameters for each recipe an average can be established. Further, in this manner also standard deviations can be defined, which can be used as tolerance threshold values. Further, in this manner a long-lasting tendency can be recognized in order to fulfill the already described maintenance situation in an appropriate manner.

Likewise subject-matter of the present invention is an extrusion installation comprising at least an extruder and at least a control device. An extrusion installation according to the invention is characterized in that the control device is configured for the performance of a monitoring method according to the invention. Accordingly, an extrusion installation according to the invention implies the same advantages like described in detail relating to the monitoring method according to the invention.

BRIEF DESCRIPTION OF THE SEVERAL VIEWS OF THE DRAWINGS

Further advantages, features and details of the invention result from the subsequent description, in which the embodiments of the invention are described in detail related to the drawings. Thereby, the features described in the claims and in the description can be essential for the invention single for themselves or in any combination. It is schematically shown:

DESCRIPTION OF SPECIFIC EMBODIMENTS OF THE INVENTION

Figure 1:
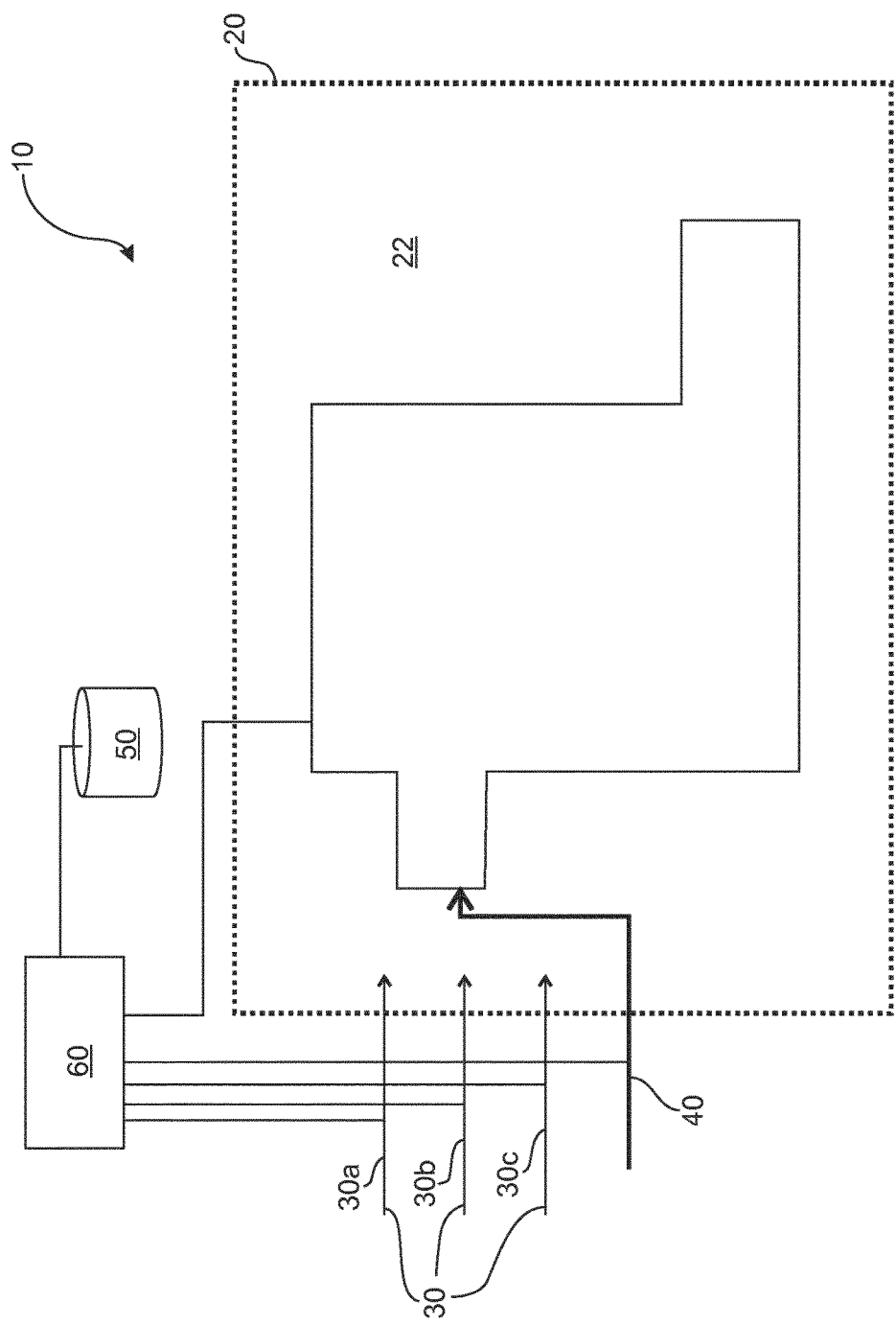
FIG. 1 an embodiment of an extrusion installation according to the invention for the performance of the method according to the invention, and FIG. 2 an embodiment of an extrusion installation according to the invention with three extruders.

In FIG. 1 an extrusion installation 10 according to the invention is schematically shown, particularly in form of a plastic extrusion installation. It is assembled completely within a balancing limit 20, namely in the balancing space 22. Beyond the balancing limit 20 into the balancing space 22 three energy flows 30 are shown with three arrows. This three energy flows 30 are separate in a cooling water flow 30a, a cooling air flow 30b, particularly in form of compressed air (in norm m$^3$) and the supply of an electric current 30c. With the thick arrow further the feed flow 40 of granules for the extrusion installation 30 is shown.

Further, this extrusion installation 10 comprises a control device 60 with an adjunctive database 50. The control device 60 monitors the three energy flows 30 while entering into the balancing space 22. Further, the feed flow 40 is monitored via the control device 60. In the control device the determination of the relation between the energy flows 30 and the feed flow 40 occurs. Using one or multiple parameters now a regulation or an intervention into the control of the extrusion installation 10 can occur.

Figure 2:
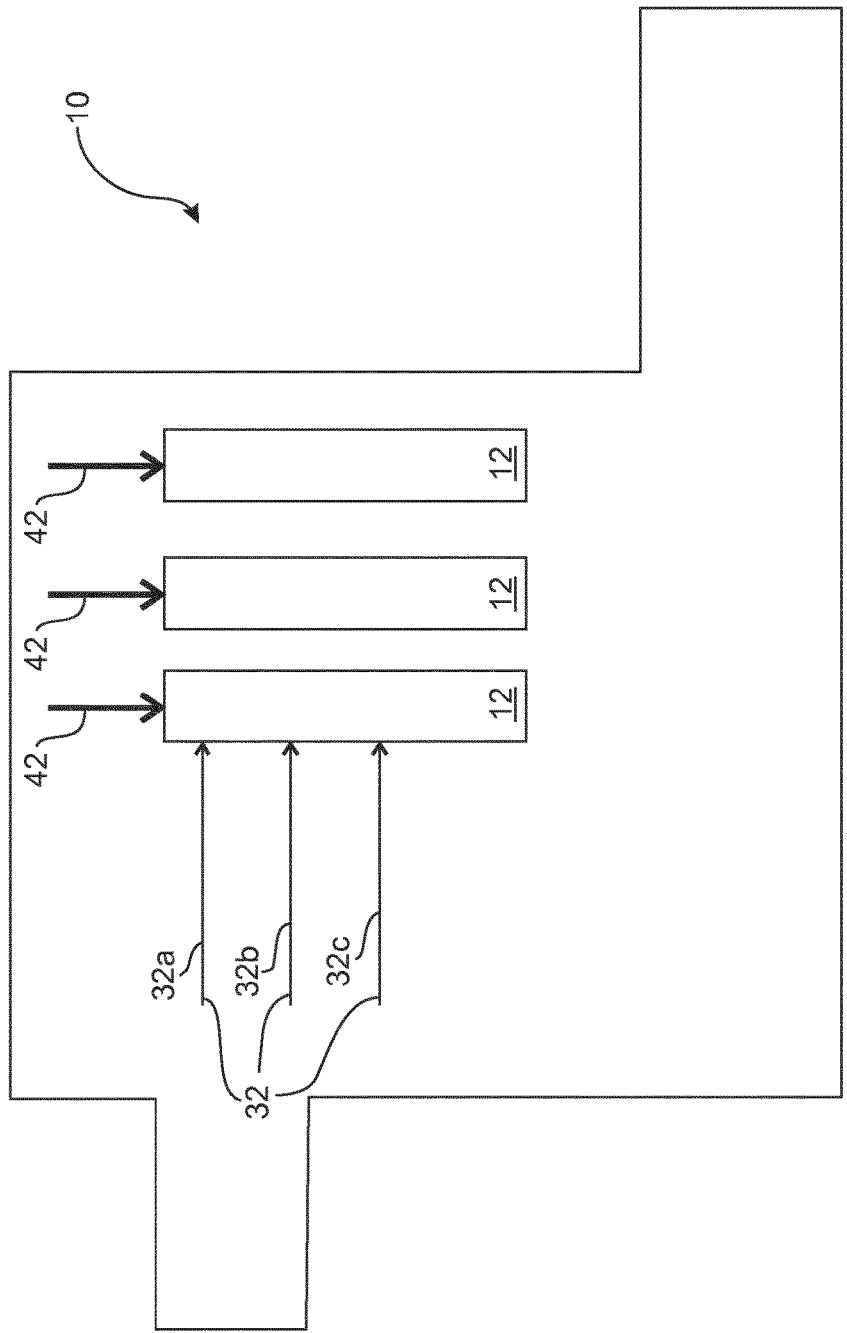

FIG. 2 shows a possibility to further increase the resolution with the monitoring according to the invention. This extrusion installation 10 is mainly identical with the embodiment of FIG. 1. However, it can be recognized that three single extruders 12 are intended. The complete feed flow 40 accordingly is divided into the single feed flows 42 to the single extruders 12. Also the complete supply of energy flows 30 is divided into energy flows 32 to the respective extruders 12. Therewith, a cooling water flow 32a to the extruder 12, a cooling air stream 32b to the extruder 12 and a supply of electric current 32c to the extruder 12 can be determined. The monitoring here occurs extruder-accurate, so that a higher resolution and an optimized intervention possibility into the control or regulation of the extrusion installation is possible.

The previous description of the embodiments describes the present invention only within the scope of examples. Naturally, single features of the embodiments as far as technically meaningful can be combined freely with one another without leaving the scope of the present invention.

REFERENCE LIST

10 Extrusion installation
12 Extruder
20 Balancing limit
22 Balancing space
30 Energy flow
30a Cooling water
30b Cooling air
30c Current
32 Energy flow to an extruder
32a Cooling water to an extruder
32b Cooling air to an extruder
32c Flow to an extruder
40 Feed flow
42 Feed flow to an extruder
50 Database
60 Control device

What is claimed is:

1. An extrusion method for improving energy efficiency by regulating intervention of an extrusion installation included in a balancing space set within a balancing limit, comprising the following:
    using at least one sensor installed in an extrusion installation for:
        monitoring of a plurality of energy flows into the balancing space, the plurality of energy flows comprise a cooling water flow, a cooling air flow, and an electric current flow
        monitoring of a feed flow of granules in the extrusion installation,
    determining a plurality of relations each between one of the plurality of energy flows and the fee flow individually;
    regulating, according to the plurality of relations, a member of a group consisting of:
        an air condition for the extrusion installation,
        a cooling device of the extrusion installation,
        air conditioning of a hall in which the extrusion installation is assembled,
        temperatures within the extrusion installation,
        temperatures of cooling water for the extrusion installation, and
        cooling of a product originated from the extrusion installation.

2. The extrusion method according to claim 1, wherein at least two energy flows are monitored into the balancing space wherein for the determination of the relation to the feed flow the sum of the monitored energy flows is used.

3. The extrusion method according to claim 1, wherein the plurality of energy flows are of a single extruder of the extrusion installation.

4. The extrusion method according to claim 1, wherein the waste heat of the extrusion installation is monitored via the determination of the relation of a performed mechanical work in the extrusion installation and the monitored energy flows.

5. The extrusion method according to claim 1, wherein a determined relation between at least one the plurality of energy flows and the feed flow is saved in a database in relation to a recipe used in the extrusion installation.

6. The extrusion method according to claim 5, wherein a comparison of the determined relation between each of the plurality of energy flows and the feed flow and a saved relation for the currently used recipe in the extrusion installation is performed.

7. The extrusion method according to claim 6, wherein the plurality of determined relations are saved in the database.

8. The extrusion method according to claim 1, wherein the cooling air is in form of compressed air (in norm $m^3$).

* * * * *